US009997889B1

(12) United States Patent
Tiemann (10) Patent No.: US 9,997,889 B1
(45) Date of Patent: Jun. 12, 2018

(54) THRESHOLD FLUORESCENCE DETECTION FOR PROTECTION OF LASER SYSTEMS

(71) Applicant: LOCKHEED MARTIN COHERENT TECHNOLOGIES, INC., Louisville, CO (US)

(72) Inventor: Bruce G. Tiemann, Longmont, CO (US)

(73) Assignee: LOCKHEED MARTIN COHERENT TECHNOLOGIES, INC., Louisville, CO (US)

(*) Notice: Subject to any disclaimer, the term of this patent is extended or adjusted under 35 U.S.C. 154(b) by 648 days.

(21) Appl. No.: 14/626,901

(22) Filed: Feb. 19, 2015

Related U.S. Application Data (60) Provisional application No. 61/942,582, filed on Feb. 20, 2014.

(51) Int. Cl.
| | | |
|---|---|---|
| *H01S 3/30* | (2006.01) | |
| *H01S 3/14* | (2006.01) | |
| *H01S 3/094* | (2006.01) | |
| *H01S 3/067* | (2006.01) | |

(Continued)

(52) U.S. Cl.
CPC .............. *H01S 3/14* (2013.01); *H01S 3/067* (2013.01); *H01S 3/06716* (2013.01); *H01S 3/094003* (2013.01); *H01S 3/00* (2013.01); *H01S 3/06754* (2013.01); *H01S 3/06762* (2013.01);

(Continued)

(58) Field of Classification Search
CPC .... H01S 3/06716; H01S 3/14; H01S 3/06762; H01S 3/06708; H01S 3/06754; H01S 3/06795; H01S 3/094003; H01S 3/1603; H01S 3/1605; H01S 3/1606; H01S 3/1608; H01S 3/1611; H01S 3/1613; H01S 3/1616; H01S 3/1618; H01S 3/11; H01S 3/1127; H01S 3/10; H01S 5/06233; H01S 5/06812
See application file for complete search history.

(56) References Cited

U.S. PATENT DOCUMENTS

| | | | | |
|---|---|---|---|---|
| 4,314,743 A | * | 2/1982 | Rast .................... | G01J 1/58 359/243 |
| 5,018,152 A | * | 5/1991 | Linne ................... | H01S 3/11 372/25 |

(Continued)

*Primary Examiner* — Jessica Manno
*Assistant Examiner* — Delma R Forde
(74) *Attorney, Agent, or Firm* — McDermott Will & Emery LLP (57) ABSTRACT

A laser device includes a gain medium configured to receive an excitation light and emit a fluorescence signal based on an amount of stored excitation light accumulated in the gain medium. The laser device includes a pump source configured to pump the excitation light to the gain medium using a supply voltage. The laser device includes one or more photodetectors configured to detect the fluorescence signal. The laser device also includes a comparator configured to generate an alert signal indicating an intensity of the detected fluorescence signal is greater than a threshold. The alert signal can trigger certain actions to occur for disrupting a destructive lasing action including one or more of ceasing output of the supply voltage to the pump source, spoiling an optical cavity to obstruct lasing action through the gain medium, or inserting a seed light to extract gain from the gain medium in a non-destructive manner.

19 Claims, 5 Drawing Sheets

(51) Int. Cl.
*H01S 3/11* (2006.01)
*H01S 3/00* (2006.01)

(52) U.S. Cl.
CPC ............ *H01S 3/06795* (2013.01); *H01S 3/11* (2013.01); *H01S 3/1127* (2013.01)

(56) References Cited

U.S. PATENT DOCUMENTS

| | | | | |
|---|---|---|---|---|
| 5,117,196 | A | * | 5/1992 | Epworth ............... H01S 3/1301 359/333 |
| 5,497,265 | A | * | 3/1996 | Fontana .................. H01S 3/067 359/341.3 |
| 5,680,246 | A | * | 10/1997 | Takahashi ............. H01S 3/1301 359/341.43 |
| 5,926,495 | A | * | 7/1999 | Guch, Jr. .............. H01S 5/0687 372/70 |
| 6,141,367 | A | * | 10/2000 | Fan ........................... H01S 3/10 372/53 |
| 2005/0226278 | A1 | * | 10/2005 | Gu ........................ H01S 3/0057 372/6 |
| 2013/0177032 | A1 | * | 7/2013 | Berendt ................ H01S 3/1306 372/9 |
| 2014/0029082 | A1 | * | 1/2014 | Itoh ..................... H01S 3/10007 359/337.1 |

* cited by examiner

THRESHOLD FLUORESCENCE DETECTION FOR PROTECTION OF LASER SYSTEMS

CROSS-REFERENCE TO RELATED APPLICATIONS

This application claims the benefit of U.S. Provisional Application No. 61/942,582, filed Feb. 20, 2014, which is incorporated herein by reference in its entirety.

STATEMENT REGARDING FEDERALLY SPONSORED RESEARCH OR DEVELOPMENT

The present disclosure was made with U.S. government support under Contract Number HR0011-13-C-0045 awarded by the Defense Advanced Research Projects Agency (DARPA). The U.S. government has certain rights in the present disclosure.

FIELD

The present disclosure relates to optically pumped laser systems and, in particular for example without limitation, to threshold fluorescence detection for protection of laser systems, including laser systems operating at high intensity.

BACKGROUND

In some cases, a laser system operates near a self-damage threshold zone, resulting in an undesired outcome involving permanent irreversible damage to the laser system. The usual cause of laser damage is excessive optical power, resulting in optical electric field strengths that exceed the dielectric breakdown strengths of optics and surfaces and/or coatings employed in the optics, thus resulting in breakdown that amounts to permanent, irreversible damage. This excessive power, in turn, is typically caused by excess un-extracted gain, which not only leads to excessive optical power when extraction begins, but also can lead to self-pulsing that produces destructive output powers even with no input to the laser system present.

Lasers susceptible to optical damage may be operated in a continuous wave (CW) manner, in a Quasi-CW (QCW) manner, or pulsed, either repetitively or non-repetitively. Typically, risk for laser damage is greater in the pulsed systems because the intensities tend to be relatively higher, but the risk is not absent in CW lasers. Fiber lasers, for example, operate at relatively high intensities even in the CW case as a result of the small mode area corresponding to the active region.

In pulsed systems, the pulses are usually output on some sort of a schedule. However, circumstances can sometimes lead to a pulse not being produced at a scheduled time. A term of art for these is "missing pulses." When a missing pulse occurs, the gain goes unextracted and continues to build as pumping continues. When the laser is operated near self-damage thresholds, even missing a single pulse could lead to damage. The pulse following the missing pulse would have been pumped for twice the interpulse period, rather than one times the period. This could lead to as much as twice the unextracted gain over the normal situation, requiring a safety margin of near 100% to avoid any damage. The safety margin would need to be even higher if more than one pulse in a row is missed.

Approaches to prevent damage caused from operating a laser system in the self-damage threshold zone have included detection of a missing-pulse(s) as well as administrative controls. However, these approaches can be limited in preventing damage in systems with agile waveforms.

SUMMARY

In some aspects, a laser device using threshold fluorescence detection is described. The laser device includes a gain medium configured to receive an excitation light and emit a fluorescence signal based on an amount of stored energy in the gain medium. The amount of stored energy being indicative of an amount of the excitation light accumulated over time after being pumped into the gain medium. The laser device includes a pump source configured to pump the excitation light to the gain medium using a supply voltage from a power supply. The laser device also includes a photodetector configured to detect the fluorescence signal. The laser device further includes a comparator circuit coupled to the photodetector and configured to generate an alert signal indicating an intensity of the fluorescence signal is greater than a threshold. In turn, the output laser beam can be altered based on the indication.

In another aspect, an optical system using threshold fluorescence detection is described. The optical system includes a laser head having a gain medium and configured to generate an output laser beam. The optical system includes a pump source coupled to the laser head. The pump source is configured to apply an excitation light to the gain medium. The optical system also includes a comparator circuit coupled to the laser head and configured to generate an alert signal indicating an intensity of a fluorescence signal emitted from the gain medium is greater than a threshold. The optical system further includes a power supply coupled to the comparator and the pump source. The power supply is configured to cease output of a supply voltage to the pump source based on the alert signal.

In yet another aspect, a method of controlling a laser system using threshold fluorescence detection is described. The method includes applying an excitation light to a gain medium using one or more pump sources. The method includes detecting a fluorescence signal emitted from the gain medium using one or more photodetectors. The fluorescence being indicative of an amount of stored energy accumulated over time after the excitation light is pumped into the gain medium. The method also includes filtering the detected fluorescence signal using one or more filters. The method also includes determining an intensity of the filtered fluorescence signal is greater than a threshold. The method also includes generating an indication to cease output from the one or more pump sources based on the intensity of the filtered fluorescence signal determined greater than the threshold. The method further includes sending the indication to a power supply electrically coupled to the one or more pump sources.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

As briefly mentioned above, a missing pulse detector in a continuous-wave (CW)-pumped, repetitively-pulsed laser system, can detect when a pulse was supposed to be present, but was not. A missing pulse detector in such a laser system can provide some benefit towards protecting the laser from damage. However, if the laser system was agile and produced a rapidly-changing interpulse interval, the missing pulse detector would need to be equally agile, so as to continue to afford the same protection. In addition, the missing pulse detector would be insensitive to other factors such as gain changes due to temperature, wavelength shift of the pump (resulting in increased absorption) or alignment changes, including a blocked cavity that prevented full extraction of the stored energy. In these cases, the missing pulse detector might not afford all the protection that might be expected, furnishing the motivation to have a stronger protection method available. Therefore, having an optically pumped laser system that can rapidly detect when optical damage is likely to occur is desirable.

Irrespective of a pulse format or repetition rate, among other things, the present disclosure can detect unsafe gain build-up without having to wait for missing pulse or other external conditions. In one or more implementations, the present disclosure provides a threshold fluorescence detector of stored energy in laser systems to combat some of the limitations of the missing-pulse detectors in the prevention of self-damage in laser systems. For example, the present disclosure relates to a mechanism for detecting substantially in real-time when the amount of stored energy is likely to cause optical damage to a laser system. In this respect, a fluorescence detector can be provided to detect stored energy and quantify a threshold level to protect the system from self-damage. The detector may notch out a lasing wavelength or select a band that excludes the lasing wavelength and pumping wavelength to correctly detect the unsafe gain buildup. Detection of stored energy via a fluorescence wavelength detector has little overhead allowing safe operation near self-damage threshold zones.

In some aspects, a laser device using threshold fluorescence detection includes a gain medium configured to receive an excitation light and emit a fluorescence signal based on an amount of stored energy in the gain medium. The amount of stored energy being indicative of an amount of the excitation light accumulated over time after being pumped into the gain medium. The laser device includes a pump source configured to pump the excitation light to the gain medium using a supply voltage from a power supply to generate an output laser beam. The laser device also includes a photodetector configured to detect the fluorescence signal. The laser device further includes a comparator circuit coupled to the photodetector and configured to generate an alert signal indicating an intensity of the fluorescence signal is greater than a threshold (e.g., a destructive lasing action). In this regard, the output laser beam can be altered based on the indication. For example, the alert signal can trigger certain actions for disrupting or altering the destructive lasing action such as: cease output of the supply voltage to the pump source, spoil an optical cavity or otherwise obstruct lasing action, and/or turn on a low-powered seed device to extract gain from the gain medium in a non-destructive manner, and not necessarily in the same direction as normal lasing action would occur.

Note that the figures showing spectra are spectrally dispersed for the purpose of providing a thorough understanding of the present disclosure. However, any single photodetector can generate a single signal that corresponds to an integration of wavelengths hitting (or penetrating) the detector at once, scaled by the detector as appropriate for the response of the detector at each wavelength present in the beam.

Figure 1:
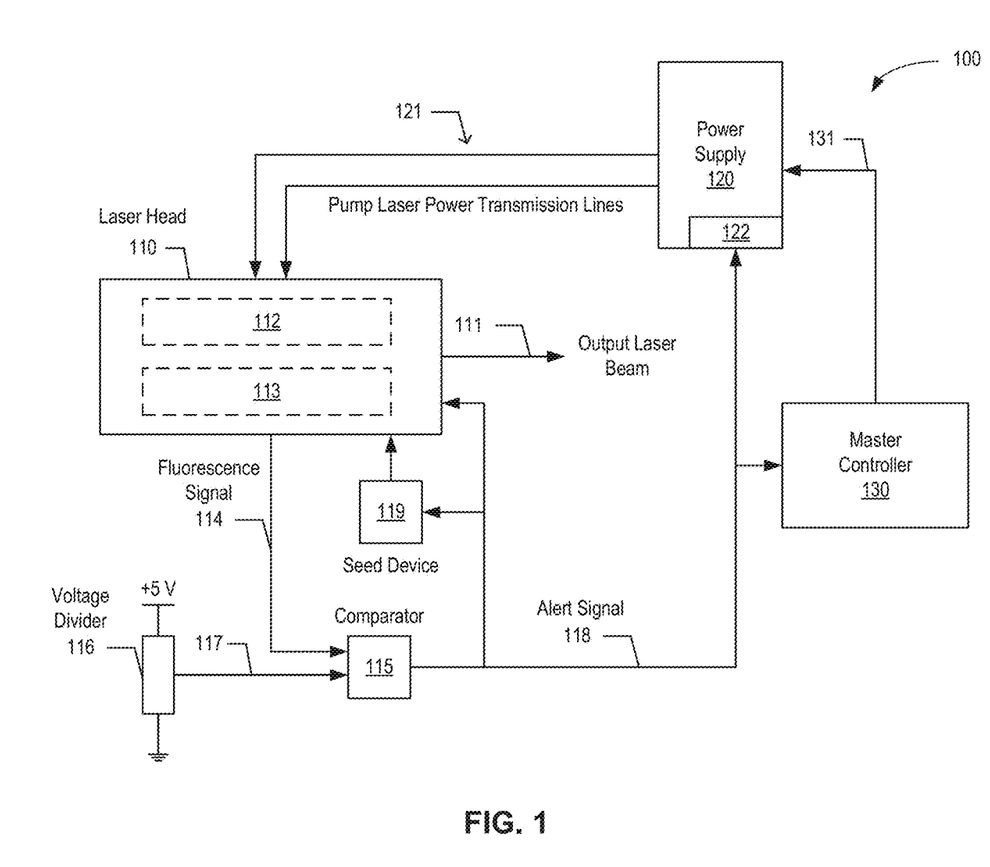
FIG. 1 is a conceptual diagram illustrating an exemplary laser system with threshold fluorescence detection, according to certain aspects of the subject technology.

FIG. 1 is a conceptual diagram illustrating an exemplary laser system 100 with threshold fluorescence detection, according to certain aspects of the subject technology. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The exemplary laser system 100 includes a laser head 110, a power supply 120 and a master controller 130. The laser head 110 is coupled to a first input to the comparator circuit 115. The comparator circuit 115 is coupled to a first input to the power supply 120 and an input to the master controller 130. A voltage divider circuit 116 is coupled to a second input to the comparator circuit 115. The master controller 130 is coupled to an input to the power supply 120. The power supply 120 is coupled to an input to the laser head 110 via one or more transmission lines 121 depicted as pump laser power transmission lines. The laser system 100 may include an oscillator (not shown) or an amplifier (not shown).

The laser head 110 includes a gain medium 113 and is configured to generate an output laser beam 111. The laser head 110 also includes a pump source 112 configured to apply an excitation light to the gain medium 113. A fluorescence signal 114 arising from an upper laser level increases in direct proportion to the gain or stored energy in the gain medium 113. In this example, the laser head may include one or more photodetectors (not shown) that are sensitive to detecting the fluorescence wavelength band(s) as a measure of the stored energy. In one or more implementations, the one or more photodetectors are insensitive to the pumping wavelength and the lasing wavelength. The fluorescence signal 114 is a useable signal that enables the interference (or interruption) of the generated stored energy. In this example, the fluorescence signal 114 may relate to an output signal from the one or more photodetectors. The gain medium 113 may be a part of the oscillator or the amplifier depending on implementation. In some aspects, the gain medium 113 includes a doped fiber material. In this example, the gain medium 113 may be an optical fiber doped with rare-earth elements such as erbium, ytterbium, neodymium, dysprosium, praseodymium, thulium, or any other rare-earth element with similar properties.

Fluorescence power is directly related to the stored energy, and the threshold can be a value at which pumping is to be ceased if the detected fluorescence power exceeds this value. The threshold level is independent of when the laser pulses occur; hence a self-damaging scenario may be detectable prior to the absence of the next pulse. The laser system 100 may be configured to not wait for another missing pulse before alerting the power supply 120 to a potentially dangerous condition, so it can be possible to detect a dangerous condition prior to the time of the next pulse. Fluorescence power may also depend on pulse format, for example pulsed or CW.

The comparator circuit 115 may be coupled to, or a part of the laser head 110. The comparator circuit 115 is configured to generate an alert signal 118 indicating an intensity of a fluorescence signal 114 emitted from the gain medium 113 is greater than a threshold. In one or more implementations, the threshold may be set to a reference voltage. In this example, the reference voltage corresponds to a maximum amount of energy allowed for storage in the gain medium 113 before damage to the laser system 100. The voltage divider circuit 116 is configured to provide a reference voltage 117 for representation of the threshold. In this example, the voltage divider circuit 116 may have a supply voltage of +5 volts and a fixed division ratio to thereby provide a threshold value that is fixed across one or more wavelengths. In one or more implementations, the division ratio may vary depending on a given wavelength. In this example, the threshold value may vary depending on a range of wavelengths being detected such that the threshold value may scale proportionately to the fluorescence intensity level corresponding to the range of wavelengths.

In one or more implementations, the comparator circuit 115 is configured to compare the intensity of the fluorescence signal for one or more wavelengths with the reference voltage. The comparator circuit 115 can generate the alert signal 118 having a first voltage (e.g., logical "1") based on the intensity of the fluorescence signal 114 determined greater than the threshold. On the other hand, the comparator circuit 115 can generate the alert signal 118 having a second voltage (e.g., logical "0") based on the intensity of the fluorescence signal 114 determined smaller than the threshold. In this example, the first voltage is different from the second voltage such as the first voltage being greater than the second voltage but can vary depending on implementation.

The power supply 120 is configured to cease output of a supply voltage to the pump source 112 based on the alert signal 118. The power supply 120 includes an interlocker component 122. The interlock component 122 is configured to receive the alert signal 118 from the comparator circuit 115 and disable an output of the power supply 120 in response to the alert signal 118. In one or more implementations, the interlocker component 122 sends an interrupt signal in response to the alert signal 118 to interrupt pump power to the pump source 112. In this example, the interrupt signal may be generated synchronous to the pump power output or asynchronous depending on implementation. The interrupt signal may be generated as a single pilot signal. Alternatively, the interrupt signal may be generated as a series of pilot signals over a duration of time (e.g., periodically or aperiodically) depending on implementation. In one or more implementations, the interrupt signal includes a timestamp indicating that the pump power output can be reactivated after expiry of the timestamp.

The master controller 130 is configured to send one or more control signals 131 to the power supply 120. In one or more implementations, the one or more control signals 131 include a control signal relating to an instruction to cause the power supply 120 to transition from a disabled output state to an active output state. The one or more control signals may include control signals relating to a soft reset, an initialization sequence, change of state from active output state to disabled output state, etc. In one or more implementations, the master controller 130 instructs the pump source 112, through the power supply 120, to switch between a pulse-based excitation light beam and a CW-based excitation light beam.

When the fluorescence signal 114 exceeds a predetermined safety level such as the threshold, the comparator circuit 115 can rapidly change states to send an interlock signal such as the alert signal 118 to a module in the power supply 120 such as the interlock component 122, which can halt pump power to the pump source 112 and thereby prevent any more energy from being deposited into the gain medium 113. In this way a damaging or dangerous condition can be avoided, thus preventing optical damage to the laser system 100. In addition, the interlocked condition may be visually indicated, or received by a computer, controller or data-logging service. In one or more implementations, the comparator circuit 115 sends the alert signal 118 to an optical cavity such as a Q-switch included in the laser head 110. In this example, the alert signal 118 triggers an obstruction of a lasing action within the optical cavity such that the any lasing action through the gain medium would be spoiled. In one or more implementations, the comparator circuit 115 sends the alert signal 118 to a seed device 119 such that the alert signal 118 triggers an indication to the seed device to generate and send a relatively low powered seed light into the gain medium 113. In this regard, gain can be extracted from the gain medium 113 in a non-destructive manner (e.g., at a safe intensity), and thereby generate the output laser beam 111 at a safe level. In this example, the seed device 119 is coupled to the laser head 110 but may be a part of the laser head 110 depending on implementation.

In operation, for a non-tunable laser operating wavelength (e.g. Nd:YAG operating at about 1064.530 nanometers (nm)), the filter blocking the lasing wavelength may need to block the fluorescence value pertaining to this wavelength. Fluorescence power emitted either at longer wavelengths or at shorter wavelengths, or both, can contribute to the detected fluorescence signal 114. In this example, the filter also can block any pump contribution, if any, to prevent any contribution to the detected fluorescence signal 114. Therefore, a fixed notch filter, a bandpass filter, a long pass (or high-pass) filter or short pass (or low-pass) filter can be used to isolate the fluorescence signal corresponding to the stored energy. In this example, the resulting signal is sent to the comparator circuit 115.

In the event that a laser such as the laser system 100 is intended to be tunable over a "relatively small" range (e.g., not covering all of a fluorescence band), the same strategy for operation as discussed in the non-tunable laser can apply. In other words, so long as a filter component obstructs wavelengths over the entire band in which the laser is intended to be operated, and there still remains useful fluorescence power outside that range, then the detection can proceed as previously discussed without modification, except that the blocked wavelengths would subtend a band instead of a single value.

In one or more implementations, the laser system 100 is tunable over nearly the entire fluorescence band. In this example, there may be a relative small amount of remaining bandwidth, over which the lasing wavelength would not operate, to usefully detect the fluorescence power within the remaining bandwidth. In this embodiment, two or more photodetector/filter combinations can be configured, including one or more detectors and one or more filter arrangements, such that either different detectors or different filters, or both, can be used to isolate different wavelength bands of the fluorescence spectrum. For example, the laser system 100 can be tunable over a range that can be considered to include a short wavelength band, a middle wavelength band, and a long wavelength band. When the laser system 100 is tuned to operate within the short wavelength band, a photodetector/filter combination can be selected that obstructs the short wavelength light, but passes fluorescence at longer wavelengths. In this case, the threshold is selected to be appropriate for that band. As the laser system 100 is tuned into the middle wavelength band, the long-wavelength detector may still be employed for use in determining whether the detected fluorescence signal 114 is greater than a threshold. But as the wavelength of laser operation approaches the long wavelength band, the fluorescence photodetector/filter combination may be switched over to the short wavelength band. In this case, the total amount of fluorescence light may be different, and therefore, the signal from that detector (e.g., the detected fluorescence signal 114) may employ a different threshold than for the long-wavelength photodetector/filter combination. However, it may be seen that an appropriate fluorescence detection scheme may be generated irrespective of the specific wavelength, within the entire tuning range that the laser system 100 operates. In some aspects, there may be three or more fluorescence bands within which the fluorescence power is to be detected, each with not necessarily equal comparison thresholds.

In one or more implementations, irrespective of the laser operating wavelength, the output may be commanded to shift from one format to another (e.g. from pulsed to CW). Due to the different damage thresholds for pulsed light beams as opposed to CW light beams, different allowable damage thresholds might pertain. Therefore, if the laser system 100 can be controlled, for example but not by way of limitation, by a controller unit such as the master controller 130, to shift from a pulsed mode to CW mode, the master controller 130 also can alter the threshold permissible for the fluorescence. In this regard, a laser operating in the CW mode, which can be safely operated at a higher stored-energy level, can be determined to operate similar to a laser system operating in a short-pulse mode. Therefore, the master controller 130 may be configured to alter the threshold from a lower value in pulsed mode to a higher value in the CW mode. In some aspects, there may be three or more thresholds under different operating scenarios (e.g., output formats). One of ordinary skill in the art would appreciate that a laser system having a tunable laser and an agile output format may combine both the use of two or more photodetector/filter combinations with use of two or more discrete comparison thresholds for any given photodetector/filter combination, thus enabling both agile wavelength operation and agile output format.

Figure 2:
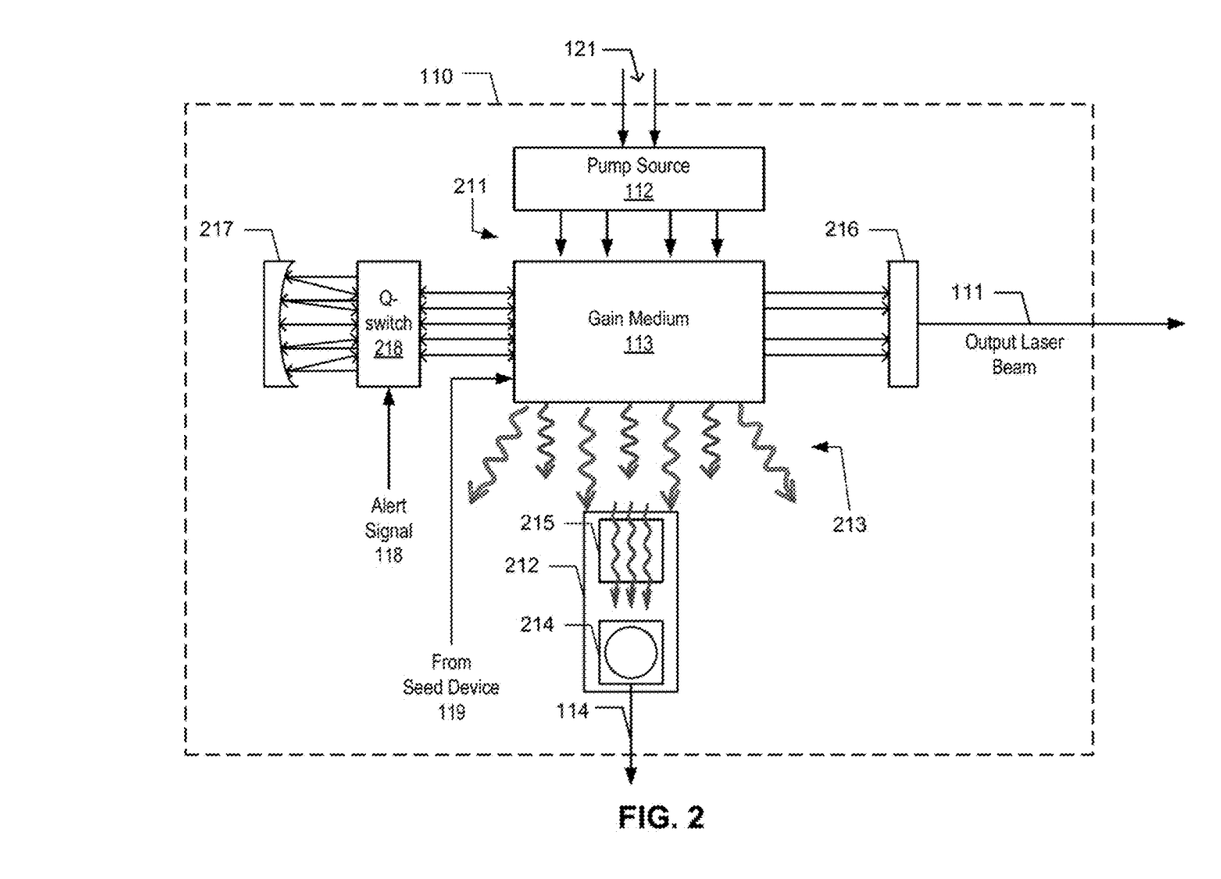
FIG. 2 is a conceptual diagram illustrating an exemplary optically pumped laser device for threshold fluorescence detection, according to certain aspects of the subject technology.

FIG. 2 is a conceptual diagram illustrating an exemplary optically pumped laser device 110 for threshold fluorescence detection, according to certain aspects of the subject technology. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The laser device 110 includes the pump source 112, the gain medium 113, a fluorescence detector 212, an output coupler 216, a back mirror 217 and a Q-switch 218. The fluorescence detector 212 includes an optical filter 215 and a photodetector 214. The back mirror 217 is positioned with respect to a first side of the Q-switch 218. The gain medium 113 is positioned along a first optical path between a second side of the Q-switch 218 and the output coupler 216. The optical filter 215 is positioned along a second optical path between the gain medium 113 and the photodetector 214. In one or more implementations, the first optical path is orthogonal to the second optical path.

The pump source 112 is configured to pump an excitation light 211 to the gain medium 113 using a supply voltage from a power supply (e.g., the power supply 120). In this example, the pump source 112 may be positioned to inject pump power into the gain medium 113 along a third optical path that is orthogonal to the first optical path. The excitation light 211 may include at least one of a continuous wave beam or a pulsed beam.

The gain medium 113 is configured to receive the excitation light 211 and emit a fluorescence signal 213 based on an amount of stored energy in the gain medium, the amount of stored energy being indicative of an amount of the excitation light 211 accumulated over time after being pumped into the gain medium. In one or more implementations, the fluorescence signal 213 is part of a fluorescence band that may be jointed or disjointed with another fluorescence band in a fluorescence spectrum.

The fluorescence detector 212 may be realized with detectors such as the photodetector 214 that are intrinsically blind at the pumping wavelength or by use of other means of spectral filtering such as glass, dielectric filter, a prism or grating spectrometer arranged to respond only to the fluorescence wavelength(s). In this example, the optical filter 215 may be configured to remove fluorescent light corresponding to one or more wavelengths from the fluorescence signal 213. In turn, the photodetector 214 is configured to detect a filtered version of the fluorescence signal 213 (e.g., without the lasing wavelength and/or pumping wavelength).

In one or more implementations, the effect of the pump energizing current from the pump source 112 on the photodetector 214 can be subtracted from the measured signal (e.g., the detected fluorescence signal 114) using the measured sensitivity of the photodetector 214 with respect to the pump wavelengths including the pump drive current. In this regard, the inferred pump level can be subtracted from the detected signal, thereby enabling determination of the remaining fluorescence power and determination of whether the detected signal is greater than the threshold. In another embodiment, a constant pumping level can be employed such that changes in optical power detected such as the fluorescence signal 213 are inferred to be limited to changes in fluorescence power, thus enabling the determination of whether the fluorescence power in the detected fluorescence signal 114 is greater than the threshold. In still another embodiment, the pump light, such as an on-off keyed light beam, may increase and decrease in a manner resembling a step function, while the fluorescence signal 213 would increase and/or decrease at a reduced rate. For example, the fluorescence signal 213 would increase as a result of leaky integration of the pump light, and would decrease as a result of the decaying population of fluorescing states. The different time-dependence of the fluorescence corresponding to the pump light enables accurate subtraction of the pump light contribution to the fluorescence signal 213 to thereby enable more accurate determination of the fluorescence signal 213, and in particular, determination of whether the detected fluorescence signal 114 is greater than the threshold.

The comparator circuit (not shown) may be coupled to an output of the photodetector 214 and configured to generate the alert signal 118 indicating an intensity of the fluorescence signal 213 is greater than a threshold. In this example, the alert signal 118 is sent to the power supply 120 to cease output of the supply voltage to the pump source 112.

The back mirror 217 is configured to reflect one or more light beams relating to the excitation light 211. The Q-switch 218 may be optically coupled to the back mirror 217 and the gain medium 113. The Q-switch 218 may be configured to produce a pulsed light beam using the reflected one or more light beams from the back mirror 217. The output laser beam 111 may be generated by the gain medium 113 using the pulsed laser beam. The output coupler 216 may be optically coupled to an output of the gain medium 113 and configured to supply the output laser beam 111 from the gain medium 113.

In one or more implementations, a coating is applied on a surface of an optical cavity such as the gain medium 113, the optical filter 215, the output coupler 216, the back mirror 217, the Q-switch 218, or any optic or optical component in the laser device 110. In this embodiment, the coating is applied to a non-pumped side of the gain medium 113, and the fluorescence is detected in transmission through the coated surface. If the coating is arranged to block one or more of the pump wavelength or the lasing wavelength, then determination of the fluorescence power (or emission) can be made with fewer or zero external filters. Note that it is common in the art to coat one end of the gain medium with a coating that is highly reflective to the pump wavelength, so as to not lose unabsorbed pump photons from this end. Therefore, there is a solid angle of light coming from this end that is already depleted in pump light, enabling accurate detection of fluorescence power level, even with less perfect removal of pump wavelength in any following filter stages.

In one or more implementations, the photodetector 214 is part of an array of photodetectors (not shown). In this embodiment, a photodetector of the array of photodetectors such as the photodetector 214 or other photodetector is selected that is sensitive to one or more fluorescence bands of the fluorescence spectrum, but which is insensitive to the pump wavelength and the lasing wavelength. In this regard, fluorescence power can be determined without susceptibility to interference from pump or lasing wavelengths and irrespective of any implementation of optical filters. For example, some gain media produce up-converted light, such as Erbium (Er) doped materials, which produce a relatively green fluorescence despite using both infrared (IR) pump light and operating at an IR lasing wavelength. In this example, the selected photodetector can detect of the up-converted fluorescence, as with an IR-blind photodetector (but with use of no other filters), to determine whether the detected fluorescence signal 114 has an intensity greater than the threshold.

Figure 3A:
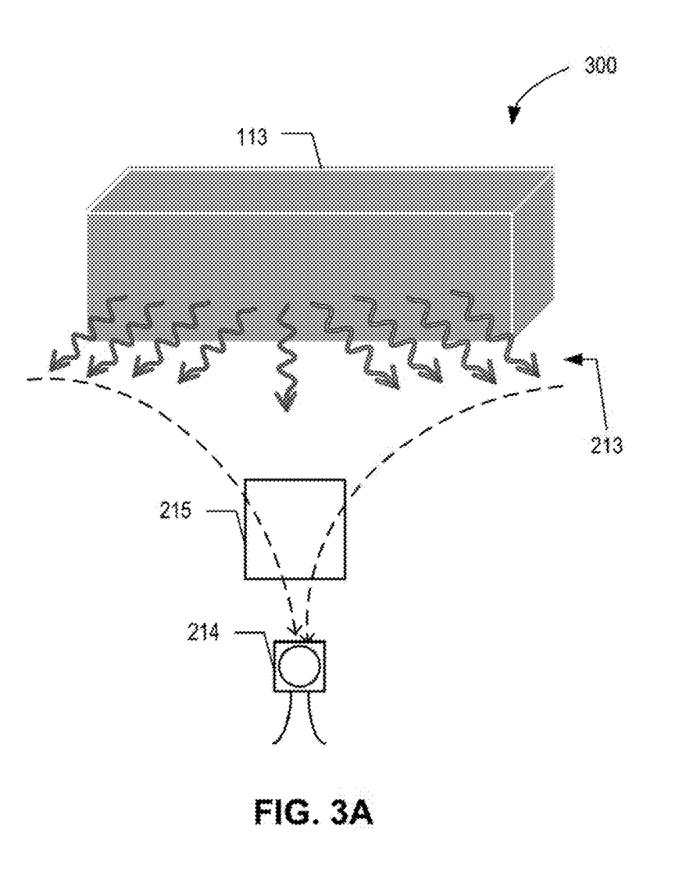
FIGS. 3A-3B are diagrams illustrating an exemplary fluorescence filtering technique and corresponding fluorescence spectra, according to certain aspects of the subject technology.
Figure 3B:
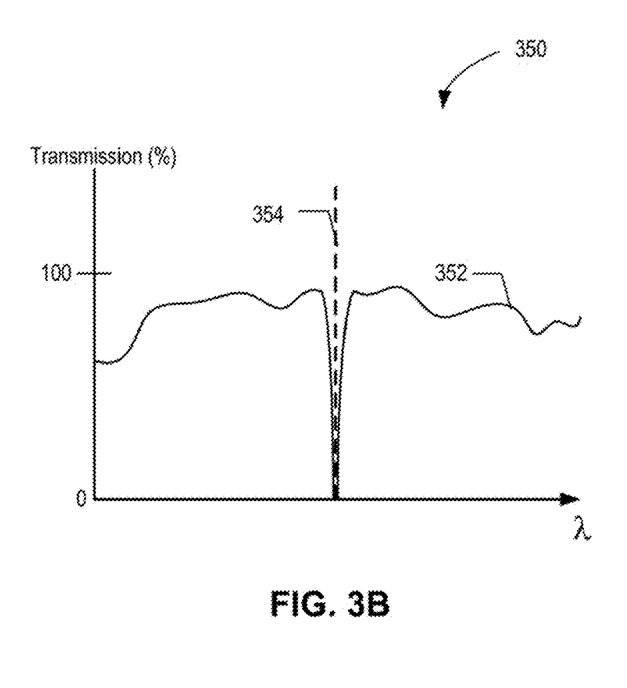

FIGS. 3A-3B are diagrams illustrating an exemplary fluorescence filtering technique 300 and corresponding fluorescence spectra 350, according to certain aspects of the subject technology. For the purpose of providing a thorough understanding of the present disclosure, FIGS. 3A-3B are shown spectrally dispersed to clarify aspects of the present disclosure, however, a photodetector may integrate the entire spectrum to produce a single-voltage signal at any point in time.

In FIG. 3A, the gain medium 113 emits the fluorescent signal 213 based on the amount of energy accumulated in the gain medium 113. As discussed above, the fluorescent signal 213 can be indicative of the accumulated energy in the gain medium 113 to determine in real-time whether a laser system is approaching a dangerous condition (e.g., self-damage threshold zone).

Since the lasing wavelength is also a fluorescence wavelength, a fluorescence detector such as the photodetector 214 may detect the lasing wavelength. In this respect, a lasing wavelength can potentially and wrongfully be interpreted as a dangerous pulse of fluorescence; when in fact the lasing wavelength represents instead a safe loss of gain attending energy extraction. The photodetector 214 can see the fluorescence band, and can interlock a spectrum if the fluorescence signal 213 exceeds predetermined safe limits. However, due to the optical filter 215, the photodetector 214 is blind to laser scatter and will not trigger due to the laser action. Consequently, the optical filter 215 may be depicted as a notch filter to notch out the lasing wavelength or depicted as a band pass filter to select a particular band of fluorescence that does not include the lasing wavelength. The optical filter 215 can be opaque at laser wavelength(s). In this example, the gain medium 113 is configured to generate a laser beam (e.g., the output laser beam 111), in which the optical filter 215 includes a notch filter configured to remove the lasing fluorescence relating to the output laser beam 111.

In FIG. 3B, the fluorescence spectra 350 includes a fluorescence waveform 352 including a portion filtered out by a notch filter depicted as the optical filter 215. In this example, a lasing fluorescence 354 is notched out at a corresponding wavelength such that the photodetector 214 can only detect the fluorescence band corresponding to the accumulated energy storage. In another example, the optical filter 215 includes a bandpass filter (not shown) configured to remove the lasing fluorescence 354 and a pumping fluorescence (not shown) relating to the excitation light 211.

FIGS. 4A-4F are diagrams illustrating fluorescence spectra with exemplary threshold fluorescence detection techniques, according to certain aspects of the subject technology. Note that the threshold is shown spectrally dispersed for the purpose of providing a thorough understanding of the present disclosure. In this regard, the threshold represents a single voltage threshold at which the comparator would trip (or signal an unsafe level), if the total photodetector signal were to exceed this threshold. The dispersed threshold is shown similar to the fluorescence spectrum, but can depart from the fluorescence spectrum as a result of detector spectral response, and more importantly, the optical filtering applied to remove pump and laser wavelengths, which may unintentionally introduce additional structure into the desired fluorescence detection band as presented to the photodetector.

Figure 4A:
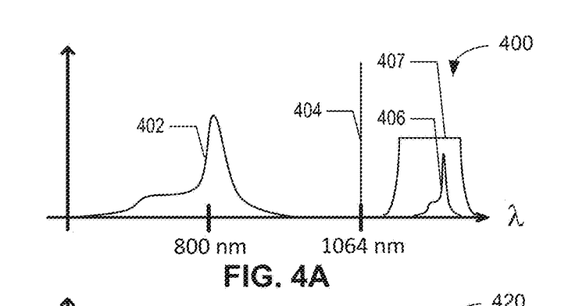
FIGS. 4A-4F are diagrams illustrating fluorescence spectra with exemplary threshold fluorescence detection techniques, according to certain aspects of the subject technology.

In FIG. 4A, diagram 400 includes spectra of various elements of the laser system 100. For example, a pumping wavelength 402 can be found at approximately 808 nm with bandwidth coverage in a range of 800 nm to about 850 nm. A lasing wavelength 404 can be found at approximately 1064 nm but can vary depending on implementation. A fluorescence band 406 exists between 1300 nm and 1350 nm, the light of which would pass filter element 407 and be detected by the photodetector 214.

Figure 4B:
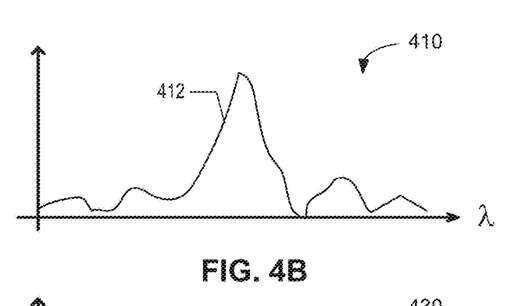
Figure 4C:
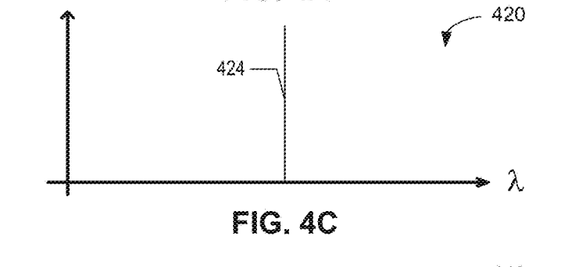
Figure 4D:
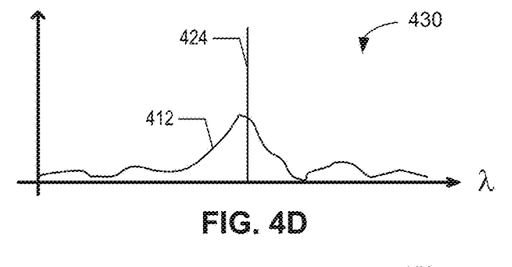

In FIG. 4B, diagram 410 depicts a fluorescence signal 412 across a range of wavelengths that is emitted from the gain medium 113 when the lasing wavelength is not present. In FIG. 4C, diagram 420 depicts a lasing wavelength 424. In FIG. 4D, diagram 430 depicts the fluorescence signal 412 of the gain medium 113 along with the lasing wavelength 424 emitted concurrently thereon. In this example, the lasing wavelength 424 co-exists with the fluorescence band that is representative of the accumulated stored energy in the gain medium 113. As such, the photodetector 214 may misinterpret the fluorescence emission as unsafe to the laser system 100.

Figure 4E:
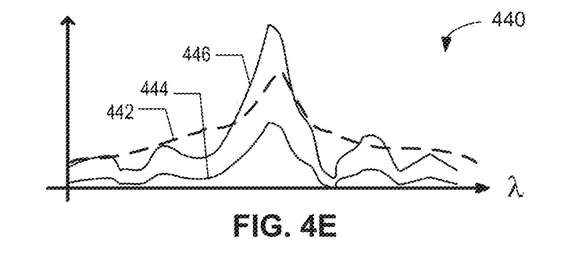
Figure 4F:
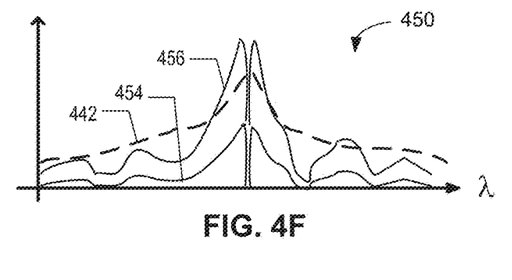

In FIG. 4E, diagram 440 illustrates two example fluorescence waveforms 444 and 446 and a fluorescence threshold waveform 442. The fluorescence waveform 444 appears to have intensity levels smaller than the fluorescence threshold waveform 442, therefore depicting a safe level of accumulated energy. However, the fluorescence waveform 446 appears to have intensity levels above the fluorescence threshold waveform 442, therefore depicting an unsafe level of accumulated energy. In this example, the fluorescence threshold waveform 442 can be used to detect and identify an unsafe level but can be falsely triggered by the lasing wavelength. See FIG. 4D. As discussed in FIG. 3B, the lasing wavelength may be notched out by the optical filter 215 to provide a filtered fluorescence signal to the photodetector 214. In FIG. 4F, diagram 450 depicts waveform 456 exceeding the fluorescence threshold waveform 442 but can be immune to false triggering by the laser because of the notch filter. In this example, the portion of the waveforms 454 and 456 are notched out at the wavelength corresponding to the lasing wavelength. Therefore, the threshold fluorescence detection can be performed without being falsely triggered by the lasing wavelength.

Figure 5:
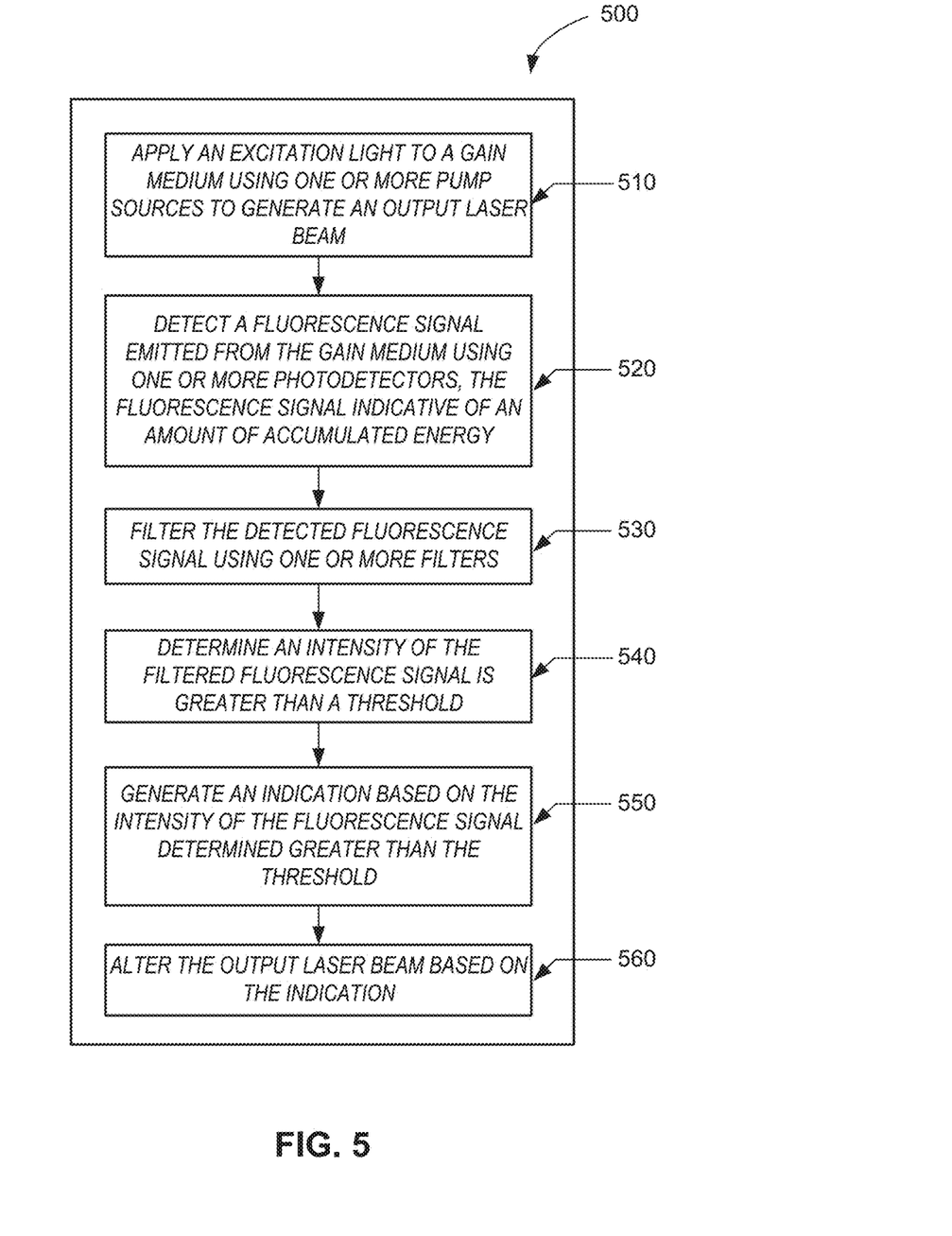
FIG. 5 is a flow diagram illustrating an example process of threshold fluorescence detection in the laser system of FIG. 1, according to certain aspects of the subject technology.

FIG. 5 is a flow diagram illustrating an example process 500 of threshold fluorescence detection in the laser system of FIG. 1, according to certain aspects of the subject technology. For explanatory purposes, the example process 500 is described herein with reference to the laser system 100 of FIG. 1; however, the example process 500 is not limited to the laser system 100 of FIG. 1, and the example process 500 may be performed by one or more components of the laser system 100, such as the laser head 110, power supply 120 and master controller 130. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

In step 510, an excitation light can be applied to a gain medium by one or more pump sources. In step 520, a fluorescence signal emitted from the gain medium can be detected by one or more photodetectors. The fluorescence signal may be indicative of an amount of stored energy accumulated over time after the excitation light is pumped into the gain medium. In step 530, the detected fluorescence signal may be filtered by one or more filters. In step 540, an intensity of the filtered fluorescence signal may be determined to be greater than a threshold. In step 550, an indication for disrupting or altering a destructive lasing action can be generated based on the intensity of the filtered fluorescence determined greater than the threshold. In step 560, the output laser beam can be altered based on the indication. For example, the indication can trigger certain actions such as cease output of the supply voltage to the pump source, spoil an optical cavity or otherwise obstruct lasing action, and/or turn on a low-powered seed device to extract gain from the gain medium in a non-destructive manner, and not necessarily in the same direction as normal lasing action would occur. In this respect, the process 500 enables detection substantially in real-time of when the amount of accumulated stored energy is likely to cause optical damage to a laser system.

In one or more implementations, a supply voltage can be provided from the power supply to the one or more pump sources as part of the process step to apply the excitation light. The supply voltage can be ceased from the power supply to the one or more pump sources based on the indication sent to the power supply. In this example, the indication relates to the threshold being exceeded, therefore indicating an unsafe level of accumulated energy. As such, the excitation light can be prevented from being output from the one or more pump sources based on the ceased supply voltage, thereby preventing the likelihood of reaching the self-damage threshold zone.

In determining the intensity of the filtered fluorescence signal to be greater than the threshold, the intensity of the fluorescence for one or more wavelengths can be compared with a reference voltage. In this example, the reference voltage may be based on an output of a voltage divider that is coupled to an input to a comparator circuit that accepts the fluorescence signal. As such, the threshold may correspond to the reference voltage.

In generating the indication to alert the power supply (or interlocker component) of the likely unsafe level of accumulated energy, the indication can be generated having a first voltage (e.g., logical "1") based on the intensity of the fluorescence signal determined greater than the threshold. Alternatively, indication can be generated having a second voltage (e.g., logical "0") based on the intensity of the fluorescence signal determined smaller than the threshold. In this example, a logical 1 as the indication would enable the interlocker component to disable the output from the power supply, thereby preventing any further pump power of reaching the gain medium.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. Any method claims present elements of the various steps in a sample order, and are not meant to be limited to the specific order or hierarchy presented. Thus, the claims, if any, are not intended to be limited to the aspects shown herein, but are to be accorded the full scope consistent with the language of the claims.

Headings and subheadings, if any, are used for convenience only and do not limit the present disclosure. Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

Phrases such as aspect, the aspect, another aspect, some aspects, one or more aspects, an implementation, the implementation, some implementations, one or more implementations, an embodiment, the embodiment, another embodiment, some embodiments, one or more embodiments, a configuration, the configuration, some configurations, one or more configurations, another configuration, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation.

The word "exemplary" is used herein to mean "serving as an example or illustration." Any aspect or design described herein as "exemplary" is not necessarily to be construed as preferred or advantageous over other aspects or designs.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the present disclosure has been described with reference to the disclosed aspects, one having ordinary skill in the art will readily appreciate that these aspects are only illustrative of the present disclosure. It should be understood that various modifications can be made without departing from the spirit of the present disclosure. The particular aspects disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present disclosure. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

Although the present disclosure has been described with reference to the disclosed embodiments, those skilled in the art will readily appreciate that these only illustrative of the present disclosure. It should be understood that various modifications can be made without departing from the spirit of the present disclosure. The present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. A method of controlling a laser system using threshold fluorescence detection, the method comprising:
    applying an excitation light to a gain medium using one or more pump sources to generate an output laser beam;
    detecting a fluorescence signal emitted from the gain medium using one or more photodetectors, the fluorescence being indicative of an amount of stored energy accumulated over time after the excitation light is pumped into the gain medium;
    filtering the detected fluorescence signal using one or more filters;
    determining an intensity of the filtered fluorescence signal is greater than a threshold;
    generating an indication based on the intensity of the filtered fluorescence signal determined greater than the threshold; and
    altering the output laser beam based on the indication,
    wherein altering the output laser beam comprises one or more of 1) interrupting a pump energizing current from the one or more pump sources, 2) obstructing an optical cavity in the laser system, or 3) applying a seed light to the gain medium to extract gain at a safe intensity.

2. The method of claim 1, wherein filtering the detected fluorescence comprises:
    applying one or more of a low-pass filter, a high-pass filter, a band pass filter or a notch filter to remove at least one or more of a pump wavelength or a lasing wavelength in the detected fluorescence signal.

3. The method of claim 1, further comprising:
    selecting a particular photodetector of an array of photodetectors included in the laser system that is at least one or more sensitive to a desired wavelength or insensitive to an undesired wavelength.

4. The method of claim 1, further comprising subtracting an energy contribution of one or more of a pump wavelength or a lasing wavelength from the detected fluorescence signal.

5. A tunable optical system comprising:
    a gain medium configured to generate an output laser beam and emit a fluorescence signal over a fluorescence band;
    a pump source configured to apply an excitation light to the gain medium; and
    a filter component configured to exclude one or more wavelengths over an addressable tuning range of the fluorescence band but passes one or more wavelengths in a remaining tuning range of the fluorescence band, the output laser beam being altered based on an alert signal indicating an intensity of the fluorescence signal is greater than a threshold, the threshold corresponding to a maximum allowable fluorescence intensity in the remaining tuning range,
    wherein the output laser beam being altered comprises one or more of 1) interrupting a pump energizing current from the pump source, 2) obstructing an optical cavity in the tunable optical system, or 3) applying a seed light to the gain medium to extract gain at a safe intensity.

6. The tunable optical system of claim 5, wherein the filter component is configured to dynamically adapt to one or more commanded wavelengths in the addressable tuning range, and wherein the threshold is varied based on a lasing wavelength commanded in the addressable tuning range.

7. The tunable optical system of claim 5, further comprising:
    a plurality of filter components, the filter component corresponding to one of the plurality of filter components; and
    a plurality of photodetectors configured to detect the fluorescence signal, different subsets of the remaining tuning range corresponding to one or more combinations of the plurality of photodetectors and the plurality of filter components, the one or more combinations being selected based on a selected commanded wavelength, different thresholds corresponding to different selected commanded wavelengths and corresponding selected combinations.

8. The tunable optical system of claim 7, wherein the one or more combinations of the plurality of photodetectors and the plurality of filter components are configured to use disjoint parts of the fluorescence band to enable different operating wavelengths, at least one photodetector/filter combination being insensitive to each operating wavelength to increase accuracy of determination of fluorescence power in the fluorescence signal.

9. The tunable optical system of claim 5, further comprising:
    a plurality of photodetectors configured to detect the fluorescence signal, each of the plurality of photodetectors having a different spectral filter for excluding different parts of the addressable tuning range; and
    one or more comparators having different thresholds, the fluorescence signal being detected using one or more of a particular photodetector of the plurality of photodetectors or a particular comparator of the one or more comparators.

10. The tunable optical system of claim 5, wherein the threshold is selected from a plurality of thresholds, each of the plurality of thresholds corresponding to a different maximum allowable fluorescence intensity based on a particular output format of the tunable optical system, the particular output format being part of a plurality of output formats including one or more of different output pulse durations, output polarization, output wavelengths, output amplitude patterns, output phase patterns, output directions, or output positions.

11. A laser system comprising:
    a gain medium configured to generate an output laser beam and emit a fluorescence signal based on an amount of stored energy in the gain medium, the amount of stored energy being indicative of an amount of excitation light accumulated over time after being pumped into the gain medium;
    a pump source configured to pump the excitation light to the gain medium using a supply voltage from a power supply;
    one or more photodetectors configured to detect the fluorescence signal, the output laser beam being altered based on an indication of an intensity of the fluorescence signal being greater than a threshold, the threshold corresponding to a maximum allowable fluorescence intensity,
    wherein the output laser beam being altered comprises one or more of 1) interrupting a pump energizing current from the pump source, 2) obstructing an optical cavity in the laser system, or 3) applying a seed light to the gain medium to extract gain at a safe intensity.

12. The laser system of claim 11, further comprising one or more filters configured to remove light corresponding to one or more of a pump wavelength or a lasing wavelength from the fluorescence signal.

13. The laser system of claim 12, further comprising:
a back mirror configured to reflect one or more light beams relating to the excitation light;
a Q-switch optically coupled to the back mirror and the gain medium, the Q-switch configured to produce a pulsed light beam using the one or more light beams from the back mirror, the output laser beam being generated by the gain medium using the pulsed light beam; and
an output coupler configured to supply the output laser beam from the gain medium.

14. The laser system of claim 13, wherein the indication includes an interlock response that triggers an action including at least one of interrupting a pump energizing current from the pump source, obstructing the Q-switch to spoil lasing action through the gain medium, or inserting a seed light to extract gain from the gain medium in a non-destructive manner.

15. The laser system of claim 14, wherein one or more of the gain medium, the one or more filters, the back mirror, the Q-switch or the output coupler has a coating to obstruct one or more of a pump wavelength or a lasing wavelength.

16. The laser system of claim 11, wherein the excitation light includes at least one of a continuous wave beam or a pulsed beam.

17. The laser system of claim 11, further comprising an oscillator, wherein the gain medium is part of the oscillator.

18. The laser system of claim 11, further comprising an amplifier, wherein the gain medium is part of the amplifier.

19. The laser system of claim 11, wherein the gain medium comprises a doped fiber material.

* * * * *